United States Patent
Tsai et al.

(10) Patent No.: US 9,308,593 B2
(45) Date of Patent: Apr. 12, 2016

(54) ANGLE-ADJUSTABLE THREAD PROCESSING MACHINE

(71) Applicant: Hiwin Technologies Corp., Taichung (TW)

(72) Inventors: Chien-Hsiang Tsai, Taichung (TW); Chih-Wei Wang, Taichung (TW); Chien-Hung Lai, Taichung (TW)

(73) Assignee: Hiwin Technologies Corp., Taichung (TW)

( * ) Notice: Subject to any disclaimer, the term of this patent is extended or adjusted under 35 U.S.C. 154(b) by 106 days.

(21) Appl. No.: 14/243,603

(22) Filed: Apr. 2, 2014

(65) Prior Publication Data

US 2015/0283633 A1    Oct. 8, 2015

(51) Int. Cl.
| | |
|---|---|
| B23G 1/04 | (2006.01) |
| F16H 1/28 | (2006.01) |
| B23C 1/12 | (2006.01) |
| B23G 1/32 | (2006.01) |
| B23Q 1/54 | (2006.01) |

(52) U.S. Cl.
CPC ... *B23G 1/04* (2013.01); *B23C 1/12* (2013.01); *B23G 1/32* (2013.01); *B23Q 1/5468* (2013.01); *F16H 1/28* (2013.01); *Y10T 82/20* (2015.01); *Y10T 409/300784* (2015.01); *Y10T 409/305656* (2015.01); *Y10T 409/308512* (2015.01)

(58) Field of Classification Search
CPC ........... Y10T 409/300784; Y10T 409/300616; Y10T 409/300672; Y10T 409/307672; Y10T 409/308232; B23C 1/12; B23G 1/32; B23G 1/34; B23Q 1/5406
USPC ......................................... 409/201, 211, 216
See application file for complete search history.

(56) References Cited

U.S. PATENT DOCUMENTS

| | | | | |
|---|---|---|---|---|
| 643,991 | A * | 2/1900 | Taylor ....................... | B23G 1/32 269/60 |
| 705,538 | A * | 7/1902 | Lake et al. ................ | B23G 1/32 409/76 |
| 1,287,732 | A * | 12/1918 | Muller ...................... | B23G 1/32 144/134.1 |
| 1,427,169 | A * | 8/1922 | Richards ................... | B23G 1/32 409/75 |
| 1,512,520 | A * | 10/1924 | Newman ................... | B23G 1/32 29/27 B |
| 2,281,353 | A * | 4/1942 | Hubbard ................... | B23C 1/12 409/144 |

(Continued)

FOREIGN PATENT DOCUMENTS

| | | | | |
|---|---|---|---|---|
| CH | EP 2161098 A1 * | 3/2010 | ................ | B23C 1/12 |
| DE | 9006627 U1 * | 10/1991 | ........... | B23Q 1/5406 |

(Continued)

*Primary Examiner* — Sunil K Singh
*Assistant Examiner* — Donte Brown
(74) *Attorney, Agent, or Firm* — Wang Law Firm, Inc.

(57) ABSTRACT

An angle-adjustable thread processing machine includes a base, a rocker arm, a rocker-arm toothed wheel, an idle wheel, a driven toothed wheel, and a processing unit. The base includes a power source with a drive shaft. The rocker arm is fixed to the drive shaft which rotates about a drive axis. The rocker-arm toothed wheel is pivotally sleeved on the drive shaft. The idle wheel is pivotally disposed on the rocker arm and engaged with the rocker-arm toothed wheel. The driven toothed wheel is pivotally disposed on the rocker arm to engage with the idle wheel and rotates around a driven axis which is located a first distance D1 from the drive axis. The processing unit includes a machining spindle fixed to the driven toothed wheel, and a machining head which rotates around a machining-head axis which is located a second distance D2 from the driven axis, and D1=D2.

3 Claims, 6 Drawing Sheets

(56) References Cited

U.S. PATENT DOCUMENTS

| | | | | |
|---|---|---|---|---|
| 2,353,994 | A | * | 7/1944 | Chapman ................ B26D 3/02 409/138 |
| 3,232,171 | A | * | 2/1966 | Hengehold ............. B23C 1/10 192/66.3 |
| 3,359,861 | A | * | 12/1967 | Johnson .................. B23Q 1/54 409/211 |
| 3,788,761 | A | * | 1/1974 | Langenbach ........... B23B 41/00 408/236 |
| 3,806,691 | A | * | 4/1974 | Roach ..................... B23H 7/26 219/69.11 |
| 4,101,405 | A | * | 7/1978 | Inoue ...................... B23C 1/12 204/224 M |
| 4,187,601 | A | * | 2/1980 | Aldrin .................... B23Q 1/48 144/1.1 |
| 4,589,174 | A | * | 5/1986 | Allen ...................... B23Q 1/48 29/33 R |
| 6,122,808 | A | * | 9/2000 | Popp .................... B23Q 1/0036 184/6.14 |
| 6,311,591 | B1 | * | 11/2001 | Grossmann .......... B23Q 1/5406 29/27 C |
| 6,554,551 | B1 | * | 4/2003 | Marelli ................ B23Q 1/0009 409/201 |
| 7,220,088 | B2 | * | 5/2007 | Ferrari ................ B23Q 11/0046 408/61 |
| 7,419,341 | B2 | * | 9/2008 | Granger ............. B23B 51/0413 173/198 |
| 7,771,146 | B2 | * | 8/2010 | Waterman ............. B08B 9/0808 147/1 |
| 8,567,278 | B2 | * | 10/2013 | Mangelsen ............. F16H 57/12 74/409 |
| 8,694,150 | B2 | * | 4/2014 | Meidar .................... B25J 9/047 409/165 |
| 2006/0288550 | A1 | * | 12/2006 | Johansson .......... B23K 20/1245 29/53 |
| 2013/0205947 | A1 | * | 8/2013 | Takahashi ............ B23Q 1/5406 74/665 B |

FOREIGN PATENT DOCUMENTS

| | | | | |
|---|---|---|---|---|
| DE | 102005046847 | A1 | * | 4/2007 ............... B23B 3/065 |
| DE | EP 2368664 | A2 | * | 9/2011 ............... B23C 3/126 |
| FR | 851627 | A | * | 1/1940 ............... B23C 1/12 |
| FR | 2461332 | A1 | * | 1/1981 ........... B23Q 1/5406 |
| GB | 414633 | A | * | 8/1934 ............... B23G 1/32 |
| GB | 1379516 | A | * | 1/1975 ............... B23C 1/12 |
| JP | WO 2011132324 | A1 | * | 10/2011 ........... B23Q 1/5406 |
| JP | 2013129029 | A | * | 7/2013 ............... B24B 41/04 |
| SI | DE 102009014273 | A1 | * | 9/2010 ......... A61C 13/0009 |
| SU | 1593790 | A1 | * | 9/1990 ............... B23C 1/12 |

\* cited by examiner

000
ANGLE-ADJUSTABLE THREAD PROCESSING MACHINE

BACKGROUND OF THE INVENTION

1. Field of the Invention

The present invention relates to a processing machine, and more particularly to an angle-adjustable thread processing machine.

2. Description of the Prior Art

A conventional thread processing machine 10, as shown in FIG. 1, generally comprises a platform 11 on which is disposed an arc-shaped rail 12, and a spindle head 13 is movably disposed on the arc-shaped rail 12, so that the angle of the spindle head 13 is changeable to cut a thread.

Since the spindle head 13 of the thread processing machine 10 moves along the arc-shaped rail 12, and the movement of the spindle head 13 requires the arc-shaped rail 12, which increases the size of the thread processing machine 10. Furthermore, it requires manual adjustment and calibration after the spindle head 13 is mounted on the arc-shaped rail 12, and the angle of the spindle head 13 is difficult to control in a precise manner.

The present invention has arisen to mitigate and/or obviate the afore-described disadvantages.

SUMMARY OF THE INVENTION

The primary objective of the present invention is to provide an angle-adjustable thread processing machine which is compact in size, easy to use, and the angle of the thread processing machining can be precisely controlled.

To achieve the above objective, an angle-adjustable thread processing machine in accordance with the present invention comprises a base, a rocker arm, a rocker-arm toothed wheel, at least one idle wheel, a driven toothed wheel, and a processing unit.

The base is provided with a power source, and the power source includes a drive shaft.

The rocker arm is fixed to the drive shaft which rotates about a drive axis.

The rocker-arm toothed wheel is coaxially and pivotally sleeved on the drive shaft.

The idle wheel is pivotally disposed on the rocker arm and engaged with the rocker-arm toothed wheel.

The driven toothed wheel is pivotally disposed on the rocker arm and engaged with the idle wheel, the driven toothed wheel rotates around a driven axis which is located a first distance away from the drive axis.

The processing unit includes a machining spindle and a machining head disposed at one end of the machining spindle, the machining spindle is fixed to the driven toothed wheel, the machining head rotates around a machining head axis which extends along a terminal end surface of the machining head, the machining head axis is located a second distance away from the driven axis, such that a position of a point on the terminal end surface of the machining head is maintained as the rocker arm pivots about the drive axis, and the second distance is equal to the first distance.

With the planetary gear, the angle of the machining head is adjustable, which simplifies and reduces the structure of the angle-adjustable thread processing machine of the present invention. On top of that, the deflection angle of the machining head is easily adjustable by controlling the rotation angle of the drive shaft, without requiring precise calculation or manual calibration. Hence, the angle-adjustable thread processing machine in accordance with the present invention is easy to use.

DETAILED DESCRIPTION OF THE PREFERRED EMBODIMENTS

Figure 1:
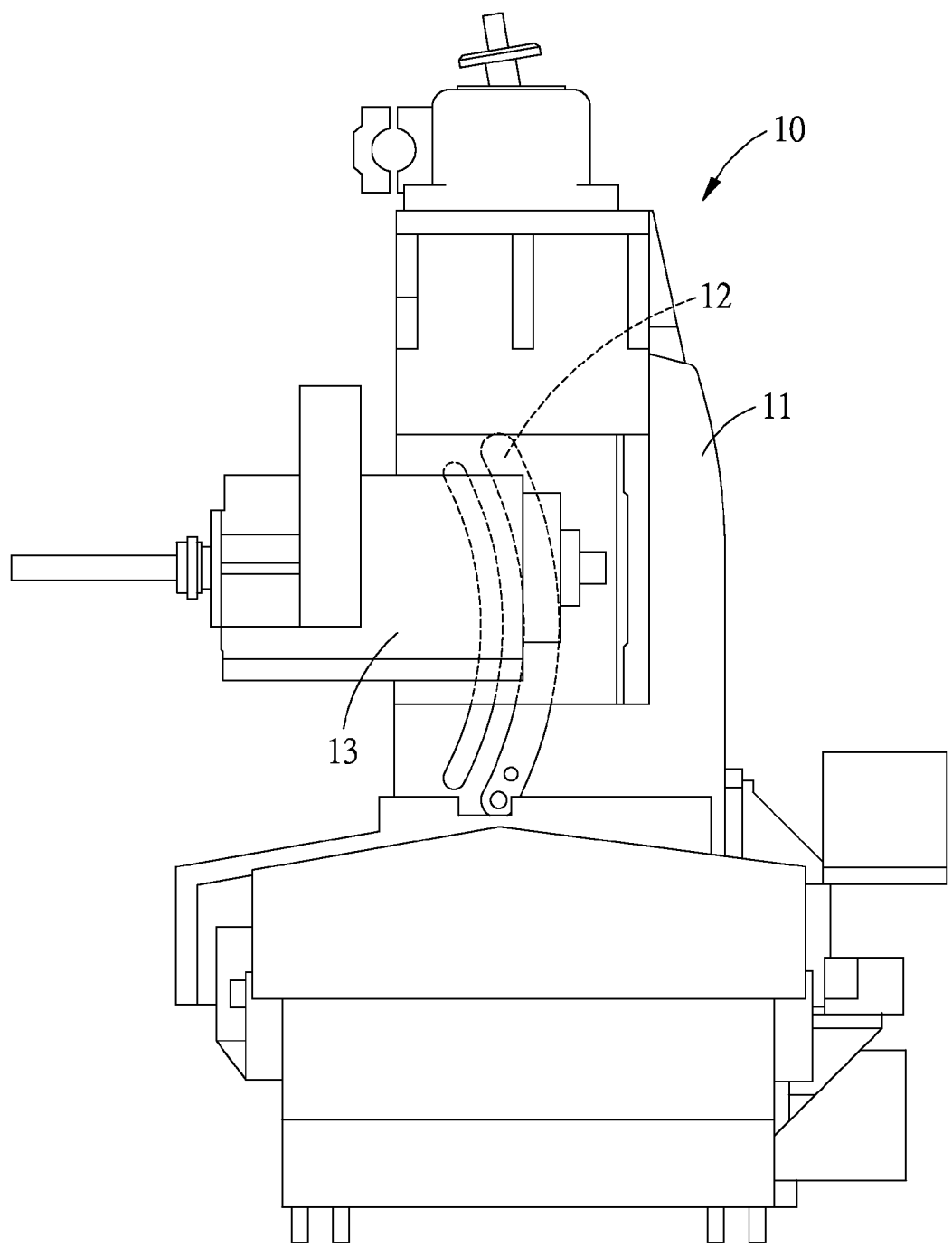
FIG. 1 shows a conventional thread processing machine.
Figure 2:
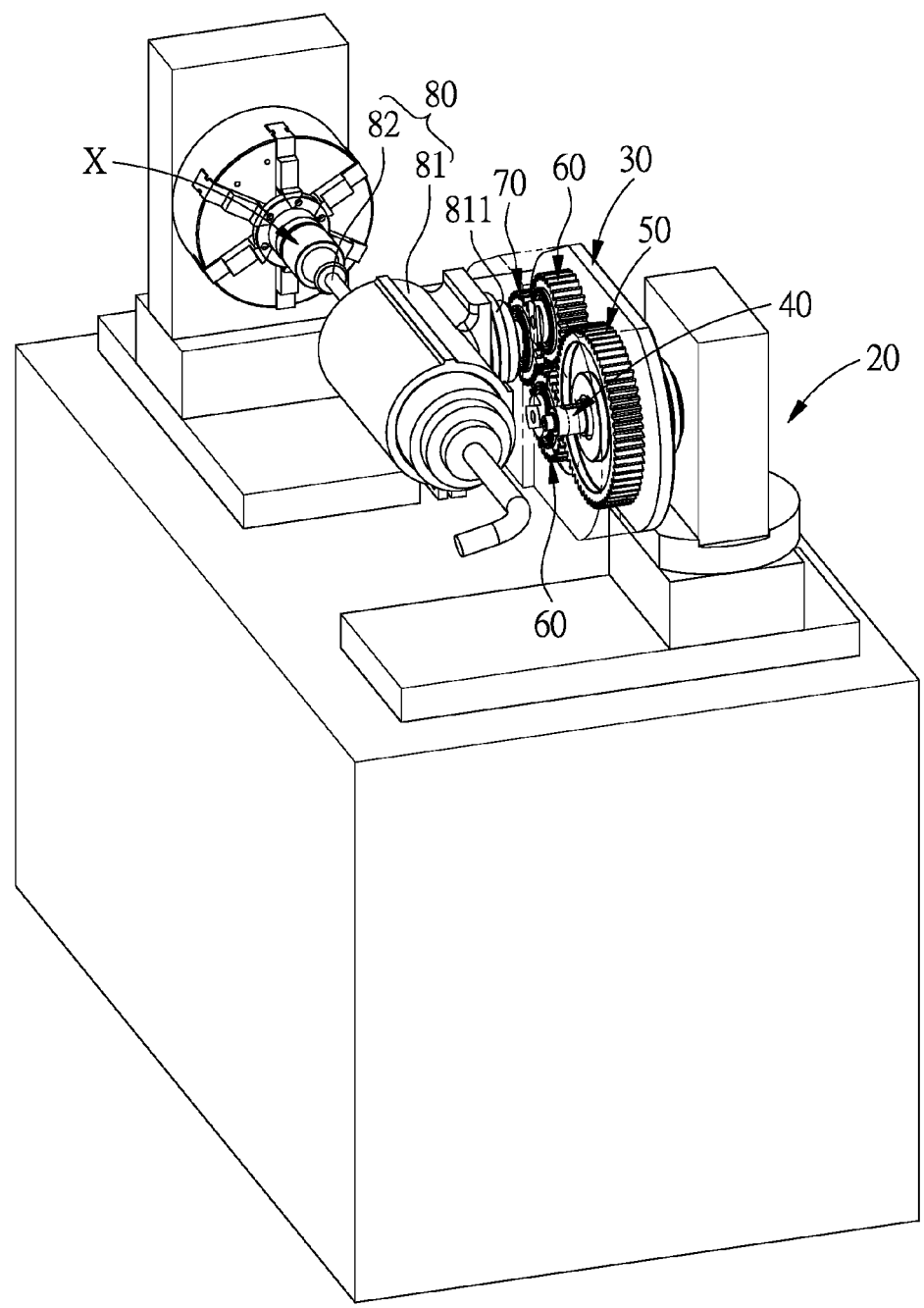
FIG. 2 shows an angle-adjustable thread processing machine in accordance with the present invention.
Figure 3:
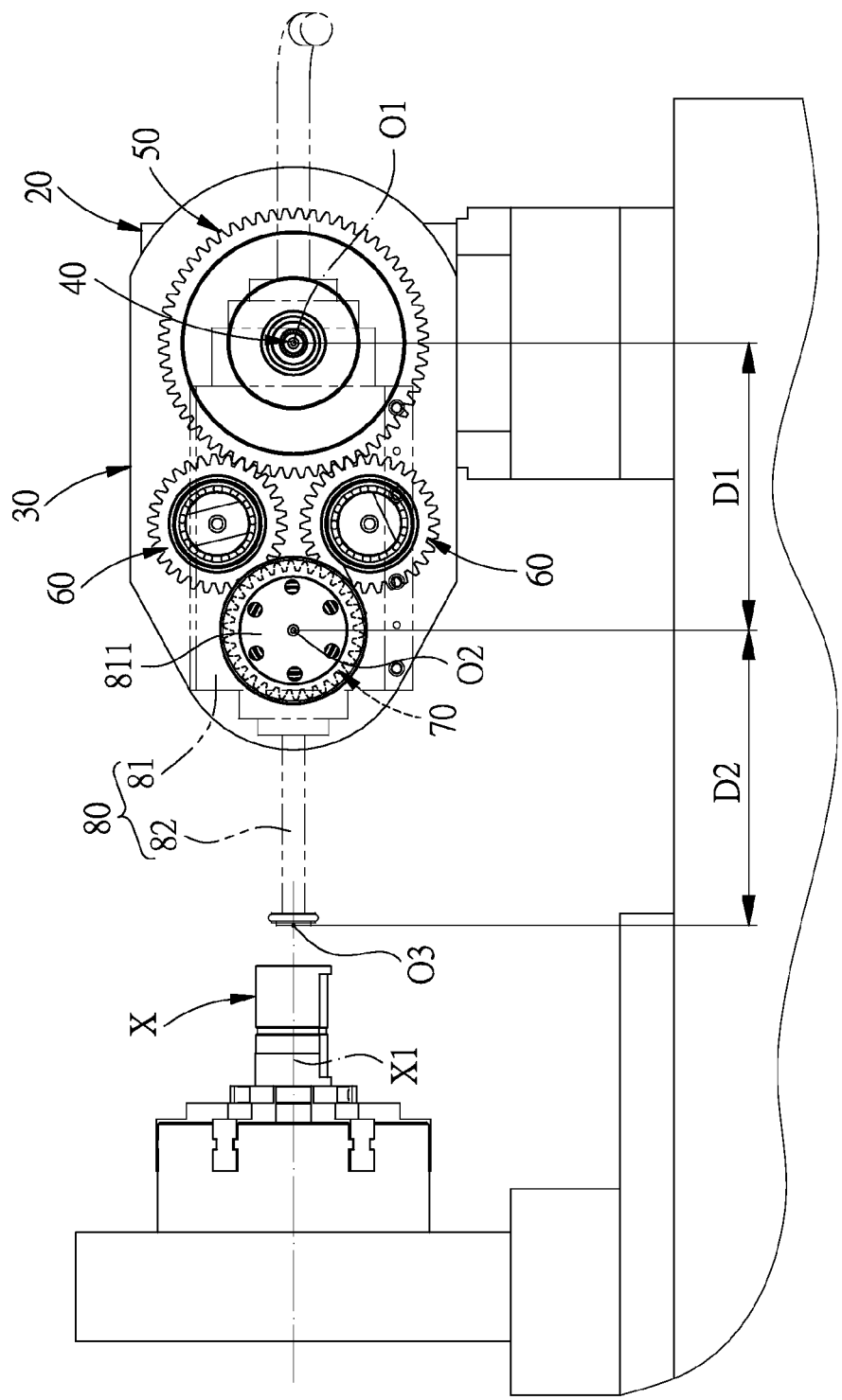
FIG. 3 is a plan view of a part of the angle-adjustable thread processing machine in accordance with the present invention, wherein the machining head is horizontally located.

The present invention will be clearer from the following description when viewed together with the accompanying drawings, which show, for purpose of illustrations only, the preferred embodiment in accordance with the present invention.

Referring to FIGS. 2-6, an angle-adjustable thread processing machine in accordance with the present invention comprises: a base 20, a rocker arm 30, a rocker-arm toothed wheel 50, at least one idle wheel 60, a driven toothed wheel 70, and a processing unit 80.

The base 20 is provided with a power source (not shown), and the power source is provided with a drive shaft 40.

The rocker arm 30 is fixed to the drive shaft 40 which rotates about a drive axis O1.

The rocker-arm toothed wheel 50 is coaxially and pivotally sleeved on the drive shaft 40.

The idle wheel 60 is pivotally disposed on the rocker arm 30 and engaged with the rocker-arm toothed wheel 50. In this embodiment, there are two idle wheels 60.

The driven toothed wheel 70 is pivotally disposed on the rocker arm 30 and engaged with the idle wheel 60. The driven toothed wheel 70 rotates around a driven axis O2 which is located a first distance D1 away from the drive axis O1.

The processing unit 80 includes a machining spindle 81 and a machining head 82 disposed at one end of the machining spindle 81. The machining spindle 81 is fixed to the driven toothed wheel 70 by a connecting member 811. The machining head 82 rotates around a machining head axis O3 which extends along a terminal end surface of the machining head 82, and the machining head axis O3 is located a second distance D2 away from the driven axis O2, such that a position of a point on the terminal end surface of the machining head 82 is maintained as the rocker arm 30 pivots about the drive axis O1, and D2=D1. The the machining head axis O3 is an axis of one end of the machine head 82 that is located towards the work piece X.

The machining head 82 is used to perform machining on a targeted work piece X which rotates around a work-piece axis X1, and the the machining head axis O3 is aligned with the work-piece axis X1. To change the deflection angle and direction of the machining head 82, it only needs to rotate the rocker arm 30 an angle with the drive shaft 40. At this moment, the rocker-arm toothed wheel 50 does not rotate, while the idle wheel 60 rotates along the rocker arm 30. Then the idle wheel 60 drives the driven toothed wheel 70 to rotate in a manner that the idle wheel 60 rotates in the same direction as the rocker arm 30, and the driven toothed wheel 70 rotates in a reverse direction to the rotation direction of the idle wheel 60 and drives the processing unit 80 to rotate in the reverse direction. Meanwhile, D1=D2, therefore, the machining head 82 may swing, but the the machining head axis O3 is still aligned with the work-piece axis X1.

Figure 4:
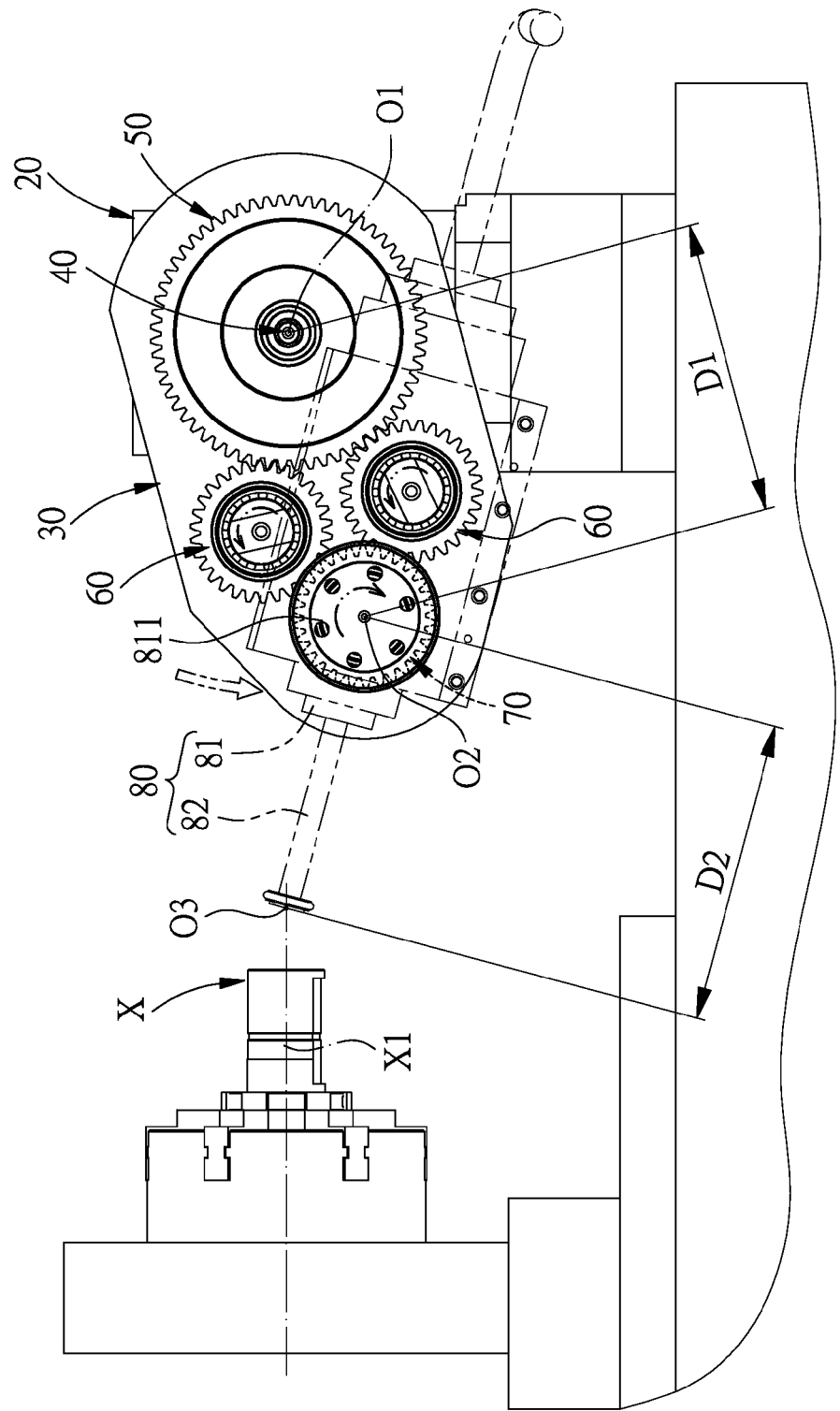
FIG. 4 is a plan view of a part of the angle-adjustable thread processing machine in accordance with the present invention, wherein the machining head swings upward an angle.

As shown in FIG. 4, for example, when the drive shaft 40 drives the rocker arm 30 to swing counterclockwise an angle, the two idle wheels 60 will be driven to rotate counterclockwise, and the driven toothed wheel 70 will rotate clockwise to drive the processing unit 80 to swing clockwise, so that the deflection angle of the machining head 82 is changed, and the the machining head axis O3 is still aligned with the work-piece axis X1.

Figure 5:
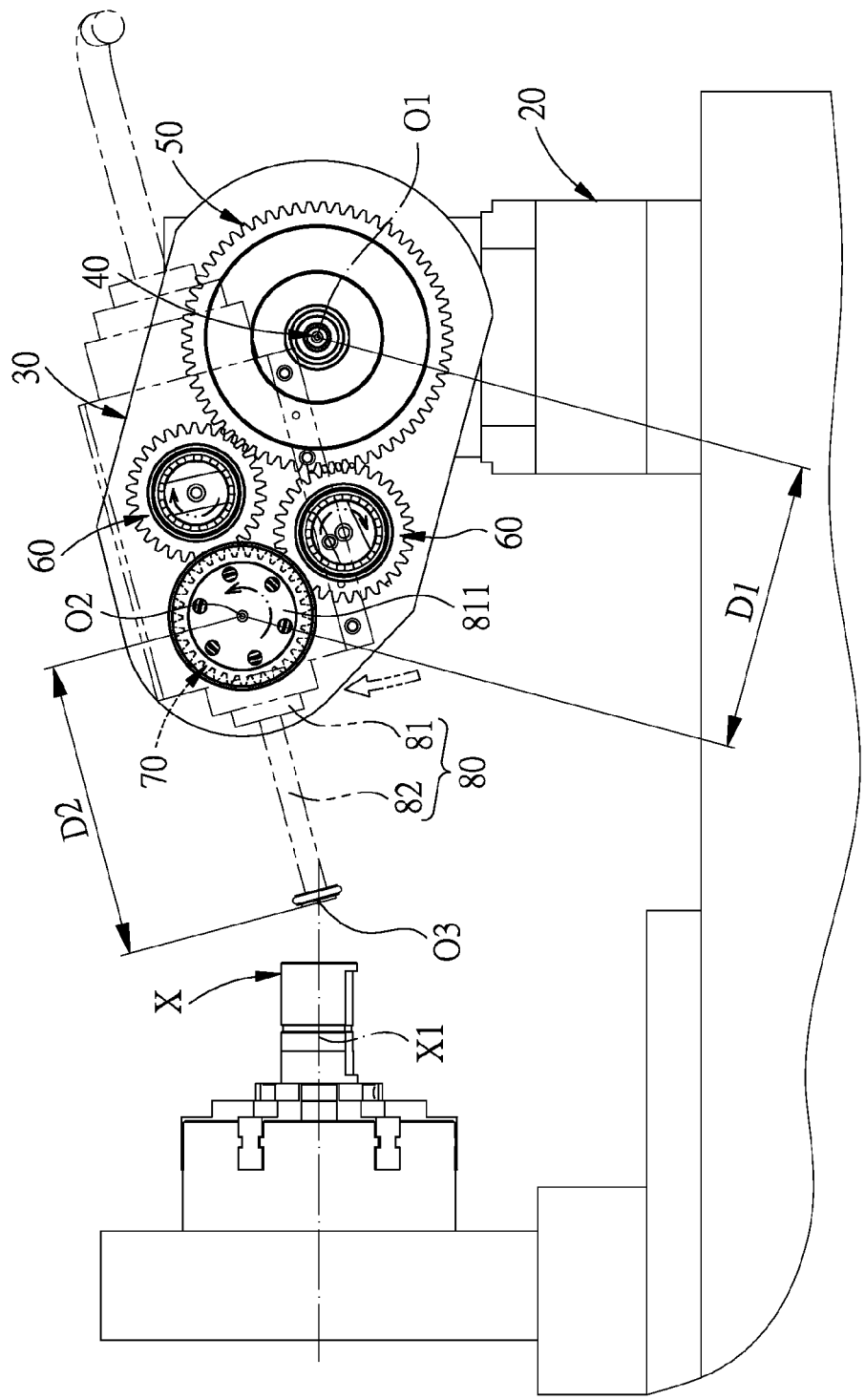
FIG. 5 is a plan view of a part of the angle-adjustable thread processing machine in accordance with the present invention, wherein the machining head swings downward an angle.
Figure 6:
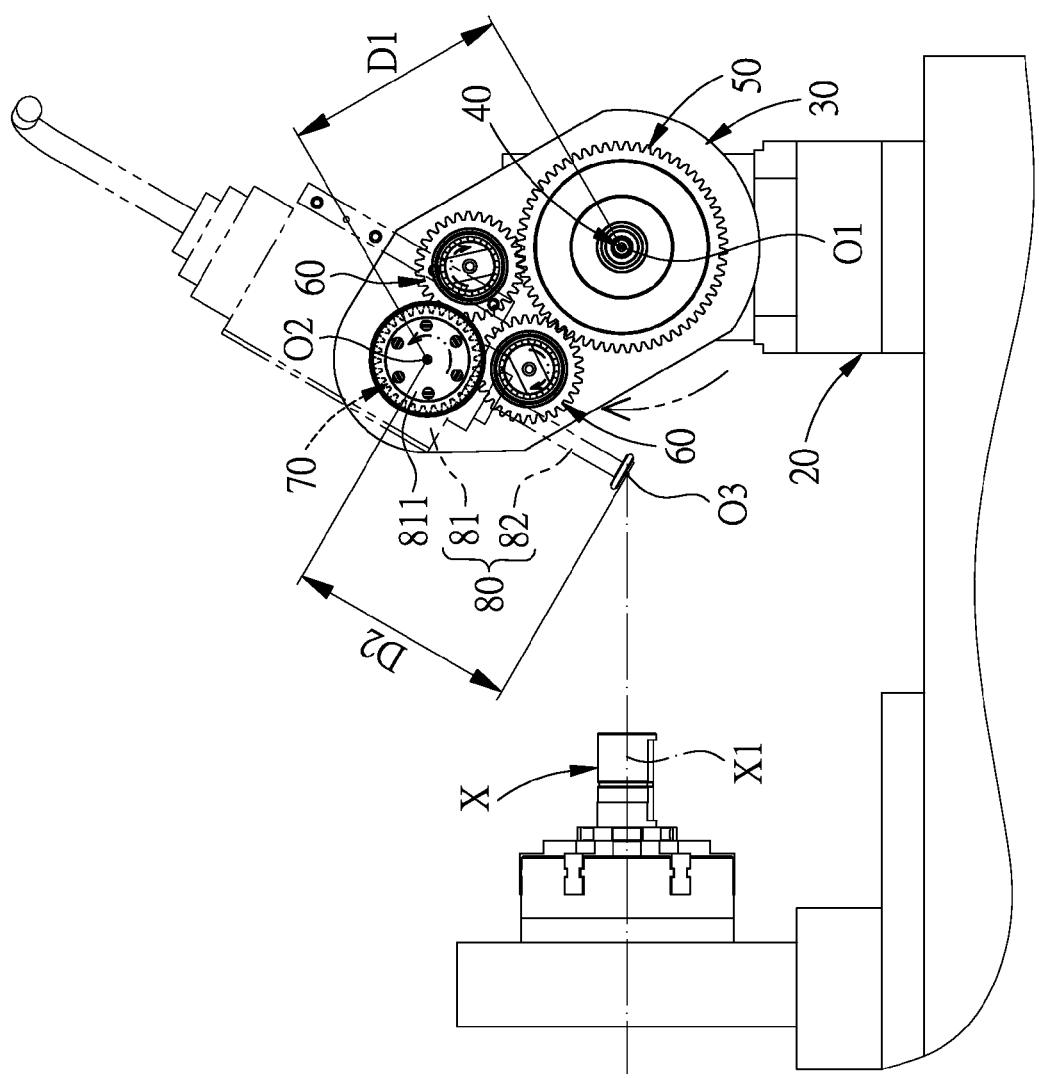
FIG. 6 is a plan view of a part of the angle-adjustable thread processing machine in accordance with the present invention, wherein the machining head further swings downward an angle.

As shown in FIGS. 5 and 6, when the drive shaft 40 drives the rocker arm 30 to swing clockwise an angle, the two idle wheels 60 will be driven to rotate clockwise, and the driven toothed wheel 70 will rotate counterclockwise to drive the processing unit 80 to swing counterclockwise, so that the deflection angle of the machining head 82 is changed, and the the machining head axis O3 is still aligned with the work-piece axis X1.

It is clear from the above description that, with the planetary gear, the angle of the machining head 82 is adjustable, which simplifies and reduces the structure of the angle-adjustable thread processing machine of the present invention. On top of that, the deflection angle of the machining head 82 is easily adjustable by controlling the rotation angle of the drive shaft 40, without requiring precise calculation or manual calibration. Hence, the angle-adjustable thread processing machine in accordance with the present invention is easy to use.

In addition to the fact that the idle wheels 60 are capable of adjusting the deflection angle of the processing unit 80 by rotating the driven toothed wheel 70, arranging the idle wheels 60 between the driven toothed wheel 70 and the rocker-arm toothed wheel 50 can prevent the occurrence of clearance between the toothed wheels, improving stability of the whole thread processing machine of the present invention. Besides the two idle wheels 60 of the above embodiment, just arranging one idle wheel 60 can also produce the same effect as the previous embodiment.

While we have shown and described various embodiments in accordance with the present invention, it is clear to those skilled in the art that further embodiments may be made without departing from the scope of the present invention.

What is claimed is:

1. An angle-adjustable thread processing machine comprising:
   a base provided with a power source, and the power source including a drive shaft;
   a rocker arm fixed to the drive shaft, the drive shaft rotating about a drive axis;
   a rocker-arm toothed wheel coaxially and pivotally sleeved on the drive shaft;
   at least one idle wheel pivotally disposed on the rocker arm and engaged with the rocker-arm toothed wheel;
   a driven toothed wheel pivotally disposed on the rocker arm and engaged with the at least one idle wheel, the driven toothed wheel rotating around a driven axis which is located a first distance away from the drive axis; and
   a processing unit including a machining spindle and a machining head disposed at one end of the machining spindle, the machining spindle being fixed to the driven toothed wheel, the machining head rotating around a machining-head axis which extends along a terminal end surface of the machining head, and which machining head axis is located a second distance away from the driven axis, such that a position of a point on the terminal end surface of the machining head is maintained as the rocker arm pivots about the driven axis, and the second distance being equal to the first distance.

2. The angle-adjustable thread processing machine as claimed in claim 1, wherein the at least one idle wheel comprises two idle wheels disposed between the driven toothed wheel and the rocker-arm toothed wheel.

3. The angle-adjustable thread processing machine as claimed in claim 1, wherein the machining spindle is fixed to the driven toothed wheel by a connecting member.

* * * * *